J. H. & E. M. KELLER,

Assignors to C. J. ALBECK.

Buggy-Top.

No. 8,989. Reissued Dec. 9, 1879.

Witnesses;
F. W. Howard
R. N. Dyer

Inventors;
John H. Keller;
Edmund M. Keller,
by Geo. W. Dyer,
Atty.

N. PETERS, PHOTO-LITHOGRAPHER, WASHINGTON, D. C.

UNITED STATES PATENT OFFICE.

JOHN H. KELLER AND EDMOND M. KELLER, OF CLYDE, OHIO, ASSIGNORS TO CHARLES J. ALBECK.

IMPROVEMENT IN BUGGY-TOPS.

Specification forming part of Letters Patent No. 192,650, dated July 3, 1877; Reissue No. 8,989, dated December 9, 1879; application filed September 23, 1879.

*To all whom it may concern:*

Be it known that we, JOHN H. KELLER and EDMOND M. KELLER, of Clyde, in the county of Sandusky and State of Ohio, have invented certain new and useful Improvements in Buggy-Tops; and we do hereby declare the following to be a full, clear, and exact description of the invention, such as will enable others skilled in the art to which it pertains to make and use it, reference being had to the accompanying drawings, which form part of this specification.

Our invention relates to certain improvements in devices for adjusting buggy or carriage tops, whereby such a top can be readily raised and lowered, and can be held conveniently at any desired intermediate point of adjustment, such devices being simple in construction, and adapted to give a firm and strong support to the top when in any position; and our invention therein consists, mainly, in supporting a buggy or carriage top by means of one or more pivoted unjointed standards or rods and a clamping device for holding each of said standards or rods, whereby the top can be raised, lowered, or held at any intermediate angle of inclination; in placing such clamping device within reach of a person seated in the carriage or buggy, so that the top can be adjusted from the inside of the buggy or carriage; and, further, in constructing the pivoted unjointed standard or standards so as to limit the movement of the clamp or clamps thereon, preventing the clamps from being drawn off of the standards and stopping the forward movement of the top when it has reached its extreme forward adjustment, as fully hereinafter explained.

Figure 1:
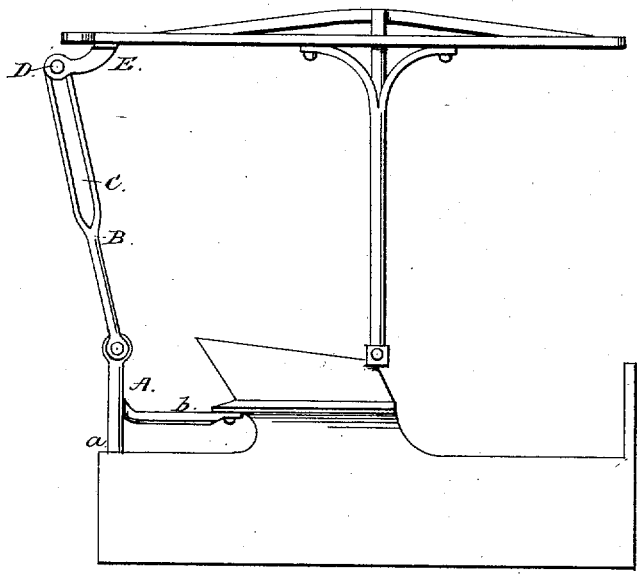
Figure 2:
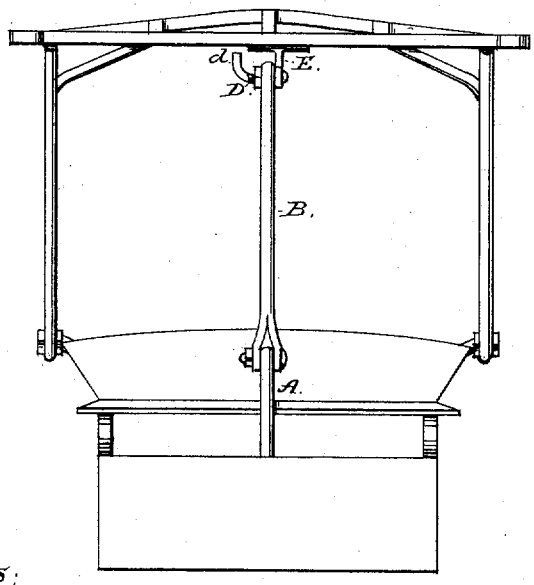

Referring to the drawings, Figure 1 is a view, in side elevation, of a buggy-box provided with our invention. Fig. 2 is a rear elevation of the same.

The box of the buggy may be made as desired, and it, together with the top, the front side standards, and their several connecting parts, have no material bearing upon the invention; but any other suitable form or construction might be substituted therefor without departing from the principle of our improvement.

The vertical upright or supporting frame A, which gives lower end bearing to the rear central standard, B, of the top, is formed with the straight arm *a*, which is secured by any suitable means to the frame-work of the box, and the rectangular arm *b*, secured to the under side of the rear portion of the seat. It is jointed at its upper extremity with the rear central standard, so as to give to the latter free movement in a vertical plane, the standard being bifurcated at its joining extremity therewith, so as to inclose either lateral side of the vertical support and permit an ordinary pivotal bolt to connect the two.

A longitudinal slot, C, is formed in a transverse line passing through the body of the standard, which is of any desired length, either longer or shorter; but, for ordinary purposes, we have found that if it extend from the upper extremity down approximately a little more than half the length of the standard it is sufficient. Within this slot the clamping pin or screw D has free travel, and acts as a sliding support, upon which the brace-rod E has bearing. This connecting-brace is secured to the rear cross-bar of the top-frame, so as to support the latter. It is preferably made with a T-end formation, which is fastened, by screw or other engaging device, to the under side of the cross-bar, while its body proper may be slightly curved out to its joining with the clamping-screw D. It is here made with an opening corresponding to this screw, which latter has a thumb-clip, *d*, by which it may be turned in either direction. It also is provided with a head at its extremity opposite to that of the handle *d*, between which and the standard B the brace is clamped.

The clamp is limited in its movement by the slot in the pivoted standard, so that the clamp cannot pull off of the standard, and the forward movement of the top is thereby stopped in raising the same when it has reached its extreme forward position.

It is apparent that other clamping mechanism can be used, if desired, for this just described, the object being to provide a connecting-support for the rear brace, E, which will move throughout the length of the sliding slot C, and thereby allow the top of the buggy to be raised, lowered, or held in any intervening angle of inclination.

To operate the device, the handle of the clamp can be readily reached by persons in the buggy, and by turning it in one direction the binding pressure upon the brace-rod is removed, when the top can be adjusted as desired. The clamp is then made to again bind the brace-rod to the side of the rear standard and securely hold the top in proper position.

The lower joint of the standard allows of its inclination at any angle in a vertical plane passing through the length of the buggy, and as the clamp slides up or down in its adjusting-slot a corresponding movement is made at this lower supporting-joint, which acts as a pivotal center.

While we prefer to use but one of these rear standards, which is secured centrally to the top, as shown and described, we do not limit our invention thereto, but include in the same standards so made and operating, whether on the rear sides or the center only, and in any number—one, two, or more—on a buggy, carriage, or other top vehicle.

Having thus fully described our invention, what we claim as new, and desire to secure by Letters Patent, is—

1. A buggy or carriage top pivoted to the buggy or carriage, and capable of being lowered and raised, in combination with one or more rigid standards or rods pivoted at one end and clamping devices through or over which said rod or rods slide, whereby the top can be raised, lowered, or held at any intermediate angle of inclination, substantially as set forth.

2. A buggy or carriage top pivoted to the buggy or carriage, and capable of being lowered and raised, in combination with one or more rigid standards or rods pivoted at one end and sliding through or over clamping devices at the other end, such clamps being placed within reach of a person seated in the buggy or carriage, substantially as and for the purpose set forth.

3. A buggy or carriage top pivoted to the buggy or carriage, and capable of being lowered and raised, in combination with one or more pivoted rigid standards or rods and clamps for supporting and adjusting the top, such clamps being limited in their movement on the standards or rods, substantially as and for the purpose set forth.

JOHN H. KELLER.
EDMOND M. KELLER.

Witnesses for J. H. Keller:
J. B. BUSH,
E. W. KELLER.

Witnesses for Edmond M. Keller:
FRANCIS POTTER,
FRANK POTTER.